UNITED STATES PATENT OFFICE.

LINN EUGENE CARPENTER, OF EAST ORANGE, NEW JERSEY, AND ELMER ELLSWORTH ELDREDGE, OF SIDNEY, NEW YORK, ASSIGNORS TO PHENIX CHEESE COMPANY, OF NEW YORK, N. Y., A CORPORATION OF NEW YORK.

SWISS CHEESE AND METHOD FOR STERILIZING THE SAME.

1,389,095.      Specification of Letters Patent.    Patented Aug. 30, 1921.

No Drawing. Original application filed June 21, 1915, Serial No. 35,477. Renewed March 14, 1918, Serial No. 222,514. Divided and this application filed March 14, 1918. Serial No. 222,312.

*To all whom it may concern:*

Be it known that we, LINN EUGENE CARPENTER and ELMER ELLSWORTH ELDREDGE, both citizens of the United States, the former residing at East Orange, in the county of Essex and State of New Jersey, and the latter residing at Sidney, in the county of Delaware and State of New York, have invented new and useful Improvements in Swiss Cheeses and Methods for Sterilizing the Same, of which the following is a specification.

This application is a division of our application Serial No. 35,477, filed June 21, 1915, for cheeses and processes for sterilizing the same.

Our invention relates to the sterilization of cheeses, and more particularly cheeses of the type known commercially as Swiss cheeses, in order to prevent or at least greatly lessen the tendency thereof to decay, and to destroy any disease germs therein contained.

We also seek to improve the flavor and the appearance of the cheese, and to render its texture homongeneous and uniform.

We have made the discovery that quite a large variety of cheeses, differing considerably in kind, may by comparatively simple and inexpensive treatment be given remarkable powers for resisting decay, and that by such treatment the cheese is otherwise greatly improved in many ways, principally by ridding it of certain kinds of undesirable bacteria.

We have also made the discovery that the basic material to be operated upon to produce the results desired may be either cheese of a single kind or a mixture of cheeses of different kinds, and that for some purposes a mixture of cheeses is preferable.

For Swiss cheese, we proceed as follows: We first grind the cheese, for instance in a sausage grinder, and add two or three per cent., by weight, of sodium citrate and eight to ten per cent., by weight, of water. We also add two per cent., by weight, of No. 1 Neufchâtel cheese. The mass is now heated to approximately 165 degrees Fahrenheit, and stirred violently, while this temperature is maintained for thirty minutes. Dry salt is now added, sufficient in quantity to render the flavor saline to any extent desired. The mass is found to be soft and plastic, and all of the water it contains is diffused uniformly as moisture. The last step is to pour into molds or boxes.

Citrates having alkaline bases other than sodium may be substituted for the sodium citrate and in some instances the alkaline salt may be dispensed with altogether. The stirring, however, is quite essential in order to promote circulation and thus insure that every particle of the cheese is subjected to an adequate degree of heat. The stirring also tends to prevent the heat from burning the cheese or causing its disintegration.

In this connection we call attention to a fact which may be readily confirmed by casual observation, namely, that when cheese of any kind is heated under ordinary conditions, it is broken up and changed greatly in character. For instance, in making Welsh rarebit, where the cheese is simply heated in a frying pan to a temperature approximating the boiling point for water, the resulting mass is resolved into a viscous, adhesive yellowish material accompanied by a quantity of free butter fat. Again, if a piece of cheese be heated to almost any temperature a little below the boiling point of water, the cheese will become grainy and lose a part of its flavor.

We have made the discovery that if the temperature used for heating be carefully adjusted as above described, a cheese may be sterilized or pasteurized, yet without being broken up or having any of its ingredients separated from others. The particular temperature for this purpose varies slightly under different conditions and with different cheeses, but allowing for this fact there is usually a proximate critical temperature at which the greatly desired result is easily accomplished.

In instances where two kinds of cheese are mixed, a single common temperature suffices for the mixture. Generally the mixture desired contains a soft cheese and a relatively small proportion of a harder cheese.

The steps such as grinding, adding water and salt and pouring into molds or boxes, though usually desirable in practice, are not in every instance absolutely necessary. The stirring, however, is essential.

What is claimed and what is desired to be secured by United States Letters Patent is:—

1. As an article of manufacture a sterile cheese containing a preponderance of Swiss cheese, a small percentage of some other cheese capable of mixing therewith into a homogeneous mass, and a small percentage of sodium citrate.

2. The method, herein described, of treating cheese, which consists in grinding Swiss cheese, adding thereto a small percentage of sodium citrate, water and Neufchâtel cheese, heating the mass to approximately 165 degrees Fahrenheit for about thirty minutes, and stirring the mass constantly while thus heated.

3. As an article of manufacture, a cheese of the Swiss genus, sterilized sufficiently to enable it to keep indefinitely under ordinary climatic temperatures, said cheese having a homogeneous texture.

4. As an article of manufacture, a cheese of the Swiss genus, so far sterilized as to enable it to keep under ordinary climatic temperatures, said cheese being inclosed in a container and having a homogeneous texture.

5. As an article of manufacture, a cheese mass containing a preponderance of a cheese of the Swiss genus, said cheese mass being inclosed in a container and sufficiently sterilized to keep indefinitely under ordinary climatic temperatures.

6. As an article of manufacture, a cheese mass sufficiently sterilized to keep indefinitely under ordinary climatic temperatures, said cheese mass containing a preponderance of Swiss cheese and a small percentage of another cheese.

7. The method herein described of treating a cheese mass containing a preponderance of cheese of the Swiss genus, which consists in heating the cheese actively stirring it while thus heated, the temperature being maintained sufficiently high and the heating and stirring being continued for a sufficient length of time to render the cheese mass permanently keeping, and inclosing the cheese mass in a container.

In testimony whereof we have hereunto signed our names, this 5th day of March, 1918.

LINN EUGENE CARPENTER.
ELMER ELLSWORTH ELDREDGE.